(12) United States Patent
Schwarzinger

(10) Patent No.: US 11,228,679 B2
(45) Date of Patent: Jan. 18, 2022

(54) BROWSER AND PHONE INTEGRATION

(71) Applicant: Ubiquity Global Services, Inc., New York, NY (US)

(72) Inventor: Franz Schwarzinger, Taguig (PH)

(73) Assignee: Ubiquity Global Services, Inc., New York, NY (US)

( * ) Notice: Subject to any disclaimer, the term of this patent is extended or adjusted under 35 U.S.C. 154(b) by 0 days.

(21) Appl. No.: 16/289,861

(22) Filed: Mar. 1, 2019

(65) Prior Publication Data
US 2020/0280631 A1     Sep. 3, 2020

(51) Int. Cl.
*H04M 3/42*     (2006.01)
*H04M 3/51*     (2006.01)

(52) U.S. Cl.
CPC ..... *H04M 3/42323* (2013.01); *H04M 3/5191* (2013.01); *H04M 2203/403* (2013.01)

(58) Field of Classification Search
CPC ........... H04M 3/42323; H04M 3/5183; H04M 3/5191; H04M 2203/403
USPC .................................................... 379/265.09
See application file for complete search history.

(56) References Cited

U.S. PATENT DOCUMENTS

| | | | | |
|---|---|---|---|---|
| 7,746,997 B2 * | 6/2010 | Brunson | ................... | G09B 7/02 379/265.02 |
| 2014/0126714 A1 * | 5/2014 | Sayko | ................. | H04L 65/1069 379/265.09 |
| 2014/0126715 A1 * | 5/2014 | Lum | .................... | H04M 3/5133 379/265.09 |
| 2014/0341366 A1 | 11/2014 | Phelps et al. | | |
| 2015/0063172 A1 | 3/2015 | Taylor | | |
| 2015/0378561 A1 * | 12/2015 | Ollinger | ............... | G06Q 30/016 707/769 |
| 2016/0328986 A1 * | 11/2016 | Corpus | ..................... | G09B 7/06 |
| 2017/0141934 A1 * | 5/2017 | Ding | ....................... | H04L 12/66 |
| 2018/0007102 A1 * | 1/2018 | Klein | .................. | H04L 65/1026 |

FOREIGN PATENT DOCUMENTS

EP          3028239 A1     6/2016

* cited by examiner

*Primary Examiner* — Ahmad F. Matar
*Assistant Examiner* — Jirapon Intavong
(74) *Attorney, Agent, or Firm* — Condo Roccia Koptiw LLP

(57) ABSTRACT

A system integrating a web browser and telephone is provided. A user enters, and the web browser receives, an input specifying a request to receive an audio output from the telephone. The web browser generates an audio stream which is communicated to the WebRTC gateway. The WebRTC gateway converts the audio stream from a first format into a second format. The WebRTC gateway communicates the converted audio stream to the SIP gateway, which forwards the audio stream to the telephone switch along with information identifying the telephone number to which the audio stream is directed. The telephone switch communicates the audio stream to the telephone where the audio stream is converted to be played using the speaker of the telephone.

16 Claims, 5 Drawing Sheets

BROWSER AND PHONE INTEGRATION

BACKGROUND

Customer service agents spend significant time seated at computer terminals while interfacing with customers via telephones. The perceived quality of the assistance provided by the agents is largely dictated by the agents' interactions with customers via the telephone.

Improving agents' interfacing skills through training is complicated by the difficulty in replicating customer interactions in a training setting. There is no easy automated way to have a controlled training dialog between an agent and a would-be customer via the telephone. Although the telephone is the primary communication device used by agents to interface with customers, there is no satisfactory automated means for providing automated, repeatable training interactions to agents via the telephone.

SUMMARY

Applicant discloses systems and methods for web browser and telephone integration. The integrated web browser and telephone may be applied, for example to provide simulated and repeatable customer service training interactions.

An example system may comprise a user computing system having a web browser executing thereon. The user computing system and the web browser may be communicatively coupled with user server applications adapted to serve web pages and content related to user functionality. For example, user server applications may provide functionality and data relating to training individuals to perform customer service representative functions.

The user computing system and web browser may be communicatively coupled with a Web Real Time Communication (WebRTC) server gateway. The WebRTC server gateway may be programmed to prepare audio and/or video from the web browser for communication to a device such as a telephone. For example, the WebRTC server gateway may be adapted to convert an audio stream from a first format into a second format.

The WebRTC server gateway may be communicatively coupled with a Session Initiated Protocol (SIP) gateway. The SIP gateway may be adapted to establish sessions for communications originating from the web browser and communicated via the WebRTC server gateway, to a telephone switch such as, for example, a private branch exchange (PBX). The PBX may be communicatively coupled with a telephone, which may be accessible to the operator of the web browser. A call recorder server and database may be adapted to record audio streams.

A user may access the web browser operating on the user system and access functionality provided by the user server applications. For example, a user may use the web browser to access applications that provide training for performing customer service functions. In an example scenario, a user may provide, and the web browser may receive an input requesting to initiate an audio session with a telephone that may be associated with the user and/or user station.

In response to the input, the web browser may generate and communicate a request to initiate an audio session with a telephone to the WebRTC server gateway. The request may comprise information identifying the telephone such as, for example, the telephone number for the telephone. In response, the WebRTC server gateway may generate a request to the SIP gateway to establish a session with the telephone. The SIP gateway may generate a request to initiate an audio session and communicate the request to the telephone switch. The telephone switch may generate and communicate to the telephone a request to initiate a session. The telephone may receive the request and establish a session with the telephone switch which may allow for subsequent voice communication from the telephone to the switch.

In an example scenario, a user, who may be a customer service trainee, may select to use the telephone to practice a customer greeting. The user trainee may enter, and the web browser may receive, an input specifying an intent to provide a voice input. The user trainee may then speak into the telephone which receives the voice input from the user. For example, the user trainee may enter a voice greeting intended to simulate a telephone customer greeting. The telephone receives the voice input and may communicate an audio stream corresponding to the voice input to the telephone switch. The telephone switch may communicate the audio stream to a recorder server which records the audio stream. The recorder server may also store the audio stream in a database for later reference by the user trainee or other person such as, for example, a trainer responsible for overseeing the trainee.

There may be scenarios that involve providing output at the telephone. For example, in connection with a customer service training program, it may be beneficial for a trainee to use the telephone to listen to a recorded simulated customer request. The user may enter, and the web browser may receive, an input specifying a request to receive an audio output from the telephone. The web browser, in combination with an application server, may generate an audio stream. The audio stream may be in a first format and be associated with a telephone number corresponding to the user's telephone. The audio stream may be communicated to the WebRTC gateway. The WebRTC gateway may be programmed to convert the audio stream from the first format into a second format compatible with a session initiation protocol (SIP) gateway. The WebRTC gateway may then communicate the converted audio stream to the SIP gateway, which forwards the audio stream to the telephone switch along with information identifying the telephone number to which the audio stream is directed. The telephone switch communicates the audio stream to the telephone where the audio stream is converted to be played using the speaker of the telephone, a connected handset or headset. The user may review the audio as it is played by the telephone.

This Summary is provided to introduce a selection of concepts in a simplified form that are further described below in the Detailed Description of Illustrative Embodiments. This Summary is not intended to identify key features or essential features of the claimed subject matter, nor is it intended to be used to limit the scope of the claimed subject matter. Other features are described below.

BRIEF DESCRIPTION OF THE DRAWINGS

The foregoing summary and the following additional description of the illustrative embodiments may be better understood when read in conjunction with the accompanying exemplary drawings. It is understood that the potential embodiments of the disclosed systems and methods are not limited to those depicted.

DETAILED DESCRIPTION OF ILLUSTRATIVE EMBODIMENTS

Applicant discloses systems and methods for web browser and telephone integration. The integrated web browser and telephone may be applied, for example to provide simulated and repeatable customer service training interactions.

Figure 1:
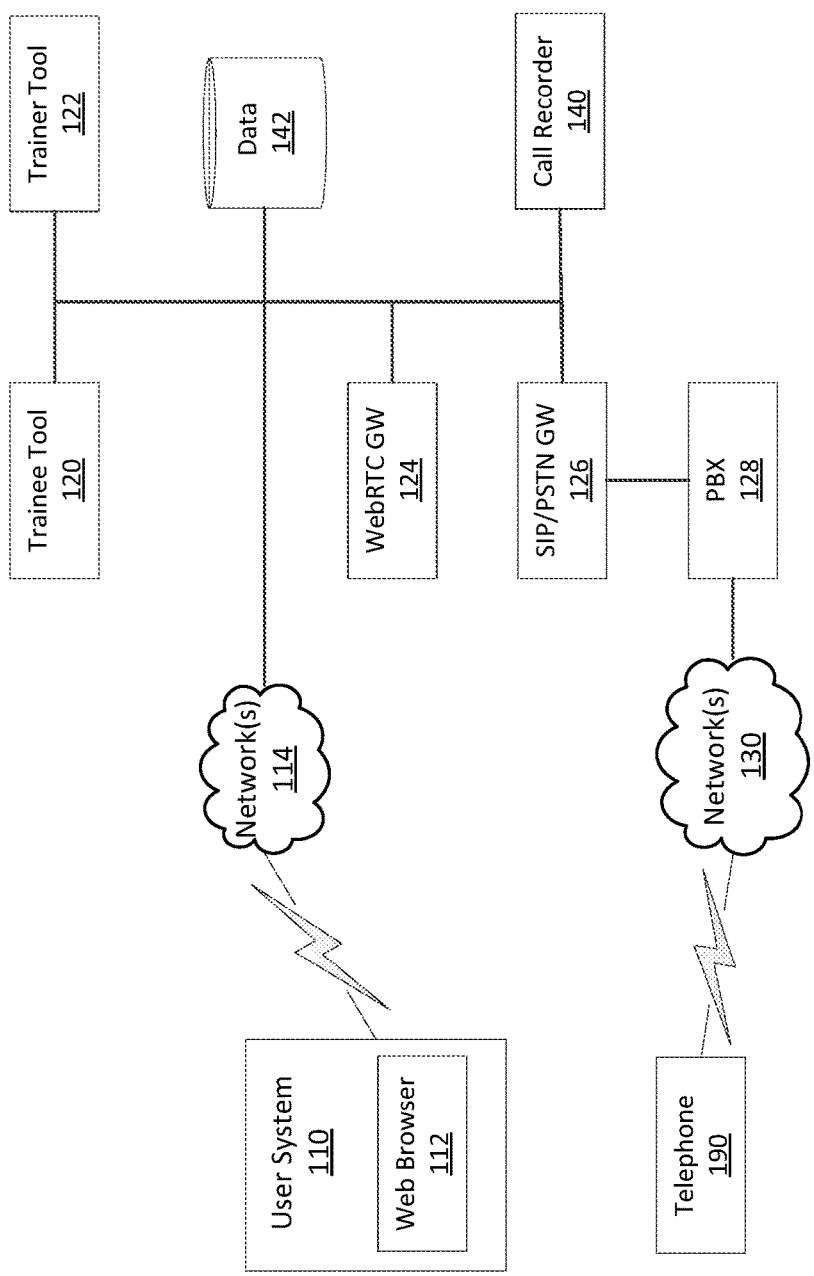
FIG. 1 is a diagram illustrating an example system.

FIG. 1 depicts an example system 100 adapted to facilitate web browser and telephone integration. In an example, a system 100 may comprise a user computing system 110 having a web browser 112 executing thereon. User computing system 110 may be any suitable computing device such as, for example, a personal computing system, computing terminal, or similar device. Web browser 112 is a software application adapted to locate, retrieve, and display information. In an example, web browser 112 may be adapted to employ HTTP and related protocols to request and receive information.

User computing system 110 and the web browser 112 may be communicatively coupled via network 114 with user server applications adapted to serve web pages and content related to user functionality. As shown in FIG. 1, user computing system 110 and web browser 112 may be communicatively coupled with trainee tool 120 and trainer tool 122 to provide functionality and data relating to training people to perform customer service functions. Trainee tool 120 may be adapted to serve to web browser 112 software and data used in training customer service representatives relating to interfacing with customers. For example, trainee tool 120 may be adapted to provide instructions and data that enable web browser 112 to present a training tool with which a user may, for example, practice providing customer voice greetings using telephone 190, to listen to simulated customer calls via telephone 190, and to provide voice responses using telephone 190 in response to simulated customer calls. Trainer tool 122 may be adapted to provide instructions and data that enable web browser 112 to present a tool with which a user may, for example, review recorded voice inputs from trainees, record simulated customer calls, and plan new trainee interactions or courses of instruction.

User computing system 110 and web browser 112 may be communicatively coupled via network 114 with Web Real Time Communication (RTC) server gateway 124. WebRTC serve gateway 124 may be programmed to prepare audio and/or video selected at web browser 112 for communication to a device such as telephone 190. For example, WebRTC server gateway 124 may be adapted to convert an audio file from a first format into a second format that may be suitable for receipt and processing at telephone 190. In an example scenario, WebRTC server gateway 124 may be adapted to convert an audio stream from web browser 112 and/or trainee tool 120 that is in the VP8 format, to an audio stream in the G.711 format or other format that is suitable for processing by telephone 190.

WebRTC server gateway 124 may be communicatively coupled via network 114 with Session Initiated Protocol (SIP) gateway 126. SIP gateway 126 may be adapted to establish sessions for communications originating from web browser 112 and communicated via the WebRTC server gateway 124, to a telephone switch such as, for example, a private branch exchange (PBX) 128. SIP gateway 126 may communicate with PBX 128 to establish a path for an audio or video stream from WebRTC to telephone 190.

PBX 128 is a telephone switching device used to control the flow of data to and from telephones. For example, PBX 128 may be adapted to switch the flow of data amongst and between multiple telephones located on a telephony network 130. PBX 128 may be further adapted to interface with systems such as SIP or PSTN gateways in order to communicate data flows to and from a telephony network.

PBX 128 is communicatively coupled over a telephony network 130 to one or more telephones including, for example, telephone 190. Telephone 190 may be any suitable device for receiving, generating, and transmitting audio, and, in some instances, video and data. Telephone 190 may be any suitable device including, for example, a physical phone device and/or a software phone operating on a general-purpose computing system. Telephone 190 may be adapted to interface with any suitable network including, for example, a private telephone network, a public switched telephone network, and/or a voice over IP (VOIP) network.

Call recorder server 140 is a device or computing system adapted to record data including, for example, audio and video data streams. For example, call recorder server 140 may be adapted to record audio and/or video received from PBX 128 and/or 126. In an example scenario, call recorder server 140 may be adapted to record audio streams originating from telephone 190 and communicated through PBX 128 to SIP gateway 126 and/or WebRTC server gateway 124. Call recorder server 140 may be any suitable computing system programmed to perform processing as described herein.

Call recorder server 140 may store recorded audio and video streams in database 142. Database 142 may be further employed to store training content, trainee responsive data, and any additional data in support of the processing described herein. Database 142 may be any data storage system suitable to perform processing as described herein.

Network 114 may comprise one or more networks and may employ any suitable networking mediums, protocols, and technologies. Network 130 may likewise comprise one or more networks and may employ any suitable networking mediums, protocols, and technologies.

Figure 2:
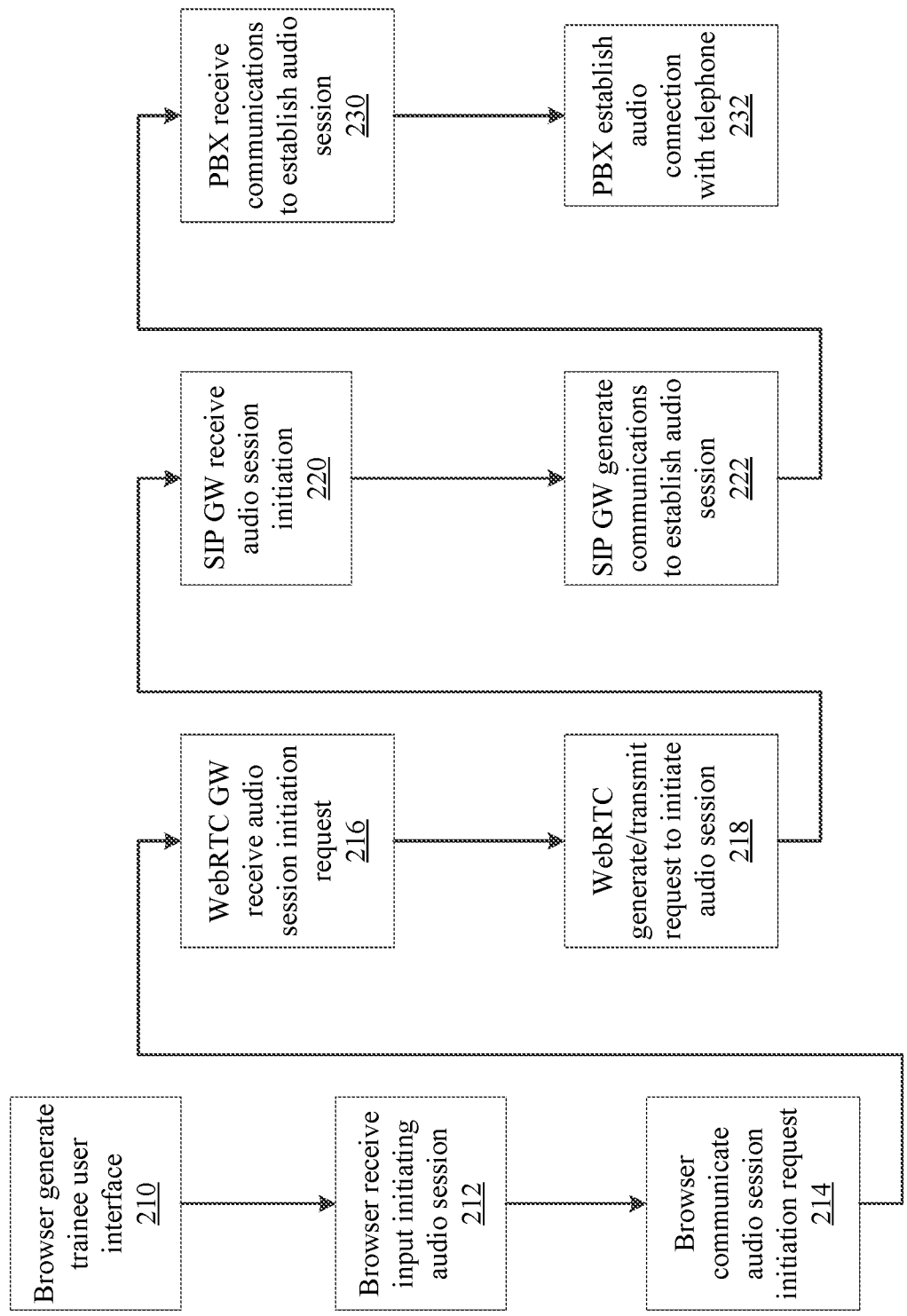
FIG. 2 is a diagram illustrating example processing for establishing communication.

A user may access web browser 112 operating on user system 110 and access functionality provided by server applications such as trainee tool 120 and trainer tool 122. For example, a user may use web browser 112 to access training features for performing customer service functions. FIG. 2 depicts a diagram illustrating processing for establishing a communication session with a telephone in response to an initiation by browser application. Referring to FIG. 2, at 210, web browser 112 may generate a user interface. For example, web browser 112 may communicate with trainee tool 120 to request and receive data for generating a user interface adapted to provide access to user training functionality.

At 212, a user may enter, and web browser 112 may receive an input initiating an audio session. For example, a user may select on an interface presented by web browser 112 to proceed through a course of training that involves providing voice input via telephone 190.

In response to the input, at 214, web browser 112 may generate and communicate a request to initiate an audio session to WebRTC server gateway 124. The request may comprise information identifying the telephone such as, for example, the telephone number for the particular telephone. Web browser 112 and/or trainee tool server 120 may comprise information identifying for a user or device, a corresponding phone number. Web browser 112 may retrieve and include this information in the request to initiate a training session.

At 216, WebRTC server gateway 124 may receive the request to initiate the session including information, e.g., a phone number, identifying telephone 190. At 218, to the extent applicable, WebRTC server gateway 124 may convert or format the request into a request suitable for processing by PBX 128. WebRTC sever gateway 124 may communicate a request to initiate an audio session to SIP gateway 126.

At 220, SIP gateway 126 may receive the request to initiate an audio session. In response, at 222, SIP gateway 126 communicates with PBX 128 to establish an audio session with telephone 190. The communications may comprise one or more signals requesting to establish a communication session with telephone 190.

At 230, PBX 126 receives the communications seeking to establish an audio session with telephone 190. At 232, PBX 126 establishes or sets up audio communication with telephone 190. For example, PBX 126 may communicate one or more messages with telephone 190 to establish communications. Once communications have been established, voice communications from telephone 190 to PBX 128 may proceed.

Figure 3:
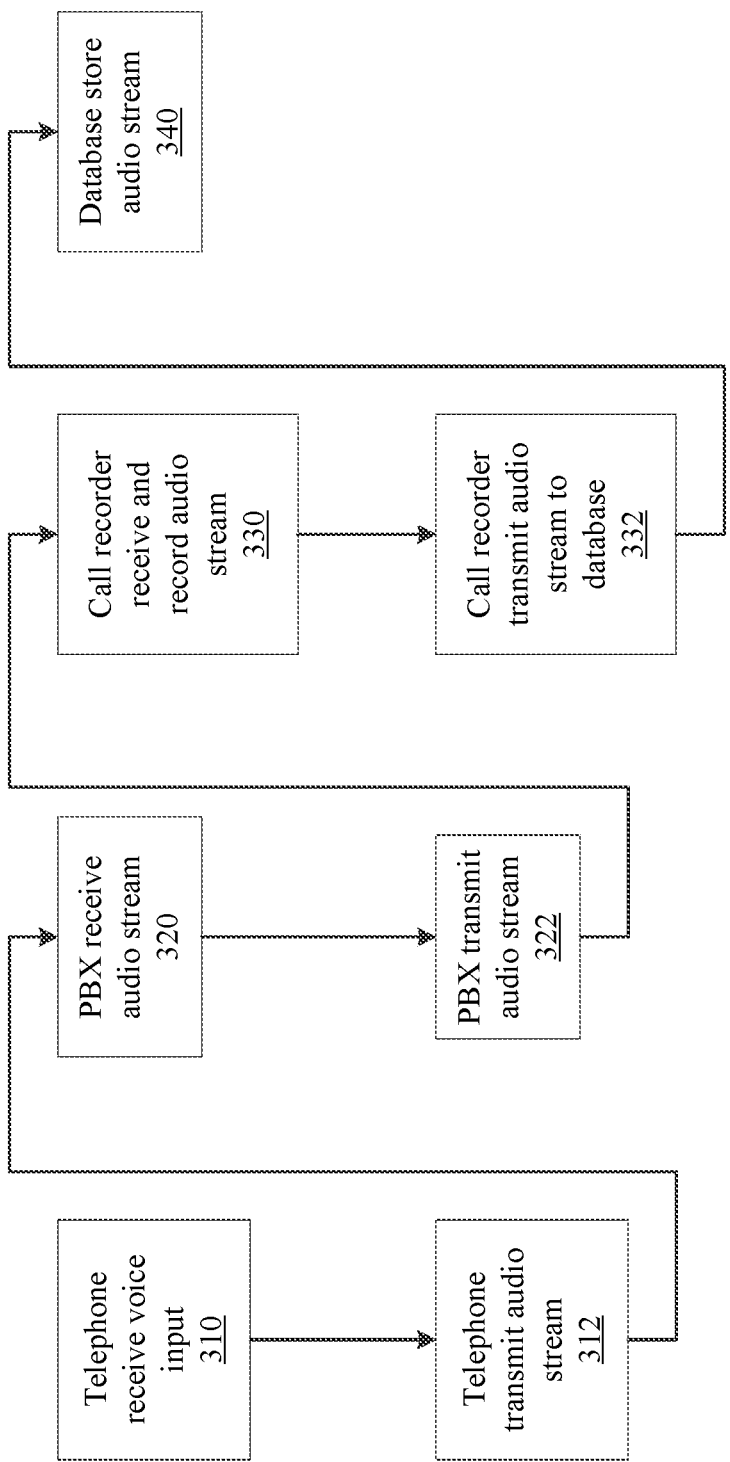
FIG. 3 is a diagram illustrating example processing for receiving audio input.

With a communication session established with telephone 190, a user may provide input via telephone 190. In an example scenario, a user may wish to practice greeting customers using telephone 190. The user may enter, and the web browser may receive, an input specifying an intent to provide a voice input. As shown in FIG. 3, at 310, the user may then enter, and telephone 190 may receive, a voice input from the user. For example, the user may enter a voice greeting meant to simulate a customer service greeting. At 312, telephone 190 transmits an audio stream corresponding to voice input.

At 320, PBX 128 receives the audio stream. PBX 128 may communicate the received audio stream via SIP gateway to call recorder server 140. The audio stream may also be communicated to WebRTC server gateway 124.

At 330, call recorder server 140 receives and records the audio stream. At 332, call recorder server 140 may communicate the recorded audio stream to database 142. At 340, the recorded audio stream is received and stored in database 142. Thereafter, the recorded audio stream may be available for review. For example, the trainee who made the recording, or a trainer who is responsible for training the trainee, may review the recording for purposes of improving trainee performance.

Figure 4:
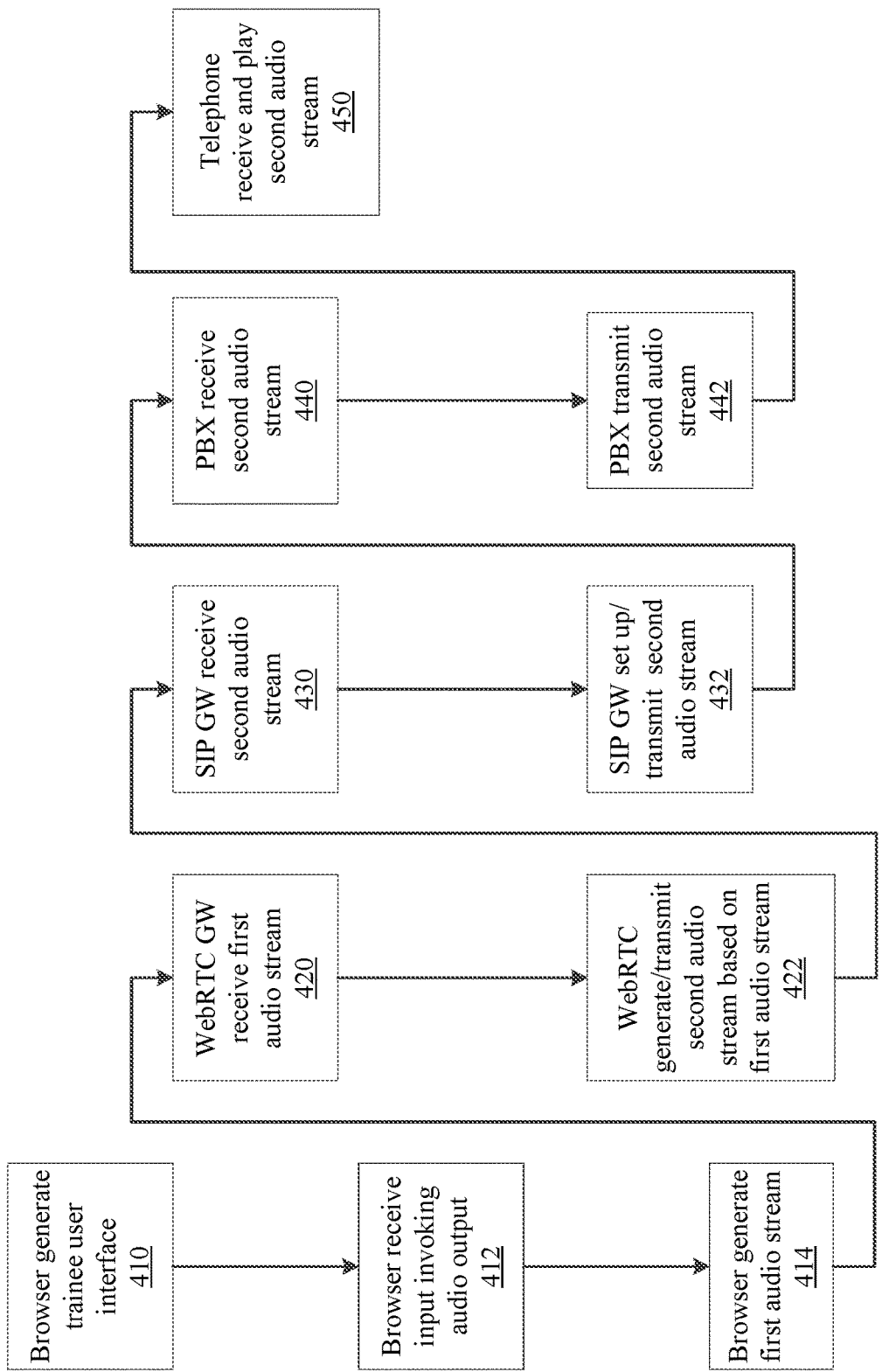
FIG. 4 is a diagram illustrating example processing for presenting audio output.

The user may use web browser 112 to initiate playing of audio content at telephone 190. FIG. 4 depicts example processing. In an example implementation, after communication between a web browser and telephone has been established as described above, at 410, web browser 112 executing on user system 110 generates a user interface. In an example, the user interface may be one associated with providing automated training. By way of further example, the user interface may provide the user with a selection of user functionality including, for example, playing a simulated client service request.

At 412, web browser 112 receives input invoking an audio output. For example, in connection with a training program, the person being trained may select to play a recording simulating a customer request for service. The user may enter, and the web browser may receive, an input that invokes receiving an audio output from telephone 190.

At 414, web browser 112 may generate a first audio stream corresponding to the received input. For example, web browser 112 may retrieve from database 142 a recording corresponding to the user selection. In an example scenario wherein the user selected to receive a simulated customer request for service, at 414, web browser 112 may retrieve from database 142 a recording corresponding to a simulated request for customer service. Web browser 112 may cause the recording to be communicated as a real time audio stream. The audio stream may be transmitted in any suitable format including, for example, VP8 format. The generated audio stream may have associated information specifying the telephone to which the audio stream is to be communicated. For example, the audio stream may have associated information specifying telephone 190 by which the audio stream is to be played.

At 420, the audio stream may be received at WebRTC server gateway 124. WebRTC server gateway 124 may be programmed to convert or translate the audio stream from a first format into a second format suitable for playing by telephone 190. For example, where the audio stream received at WebRTC server gateway 124 is VP8, WebRTC server gateway 124 may convert the audio stream to a second audio stream in G.711 format. At 422, WebRTC server gateway 124 may transmit the second audio stream to SIP gateway 126. The communicated audio stream may have associated with it, information identifying the audio stream is directed to telephone 190. For example, the audio stream may have associated with it a telephone number for telephone 190.

At 430, SIP gateway 126 receives the second audio stream. At 432, SIP gateway 126 may perform any needed communications with PBX 128 to prepare for communicating the second audio stream to PBX 128. For example, SIP gateway 126 may communicate information specifying the second audio stream is to be communicated to telephone 190. After completing any signaling to set up communication, PBX 128 may communicate the second audio stream.

At 440, PBX 128 receives the second audio stream and associated information. At 442, PBX 128 uses the associated information to identify the stream is to be communicated to telephone 190. At 442, PBX 128 communicates the second audio stream to telephone 190.

At 450, telephone 190 receives the second audio stream and plays the second audio stream at its handset, headset, or speaker.

FIG. 2 and the associated text illustrate example processing for coordinating, by a web browser, receiving audio input at a telephone and recording the audio input. FIG. 3 and the associated text illustrate example processing for coordinating, by the web browser, playing of audio output at a telephone. The described processing may be used in any suitable order to provide the desired functionality. For example, coordinating by a web browser the playing and recording of audio at a telephone may be employed by a person being trained to perform customer service functions. The trainee may record practice greetings, review/listen to those practice greetings, review simulated customer inputs, and practice responses to those customer inputs. The functionality may also be used by a trainer to review trainee recordings, to record sample greetings and simulated customer responses, and plan new courses of training.

Figure 5:
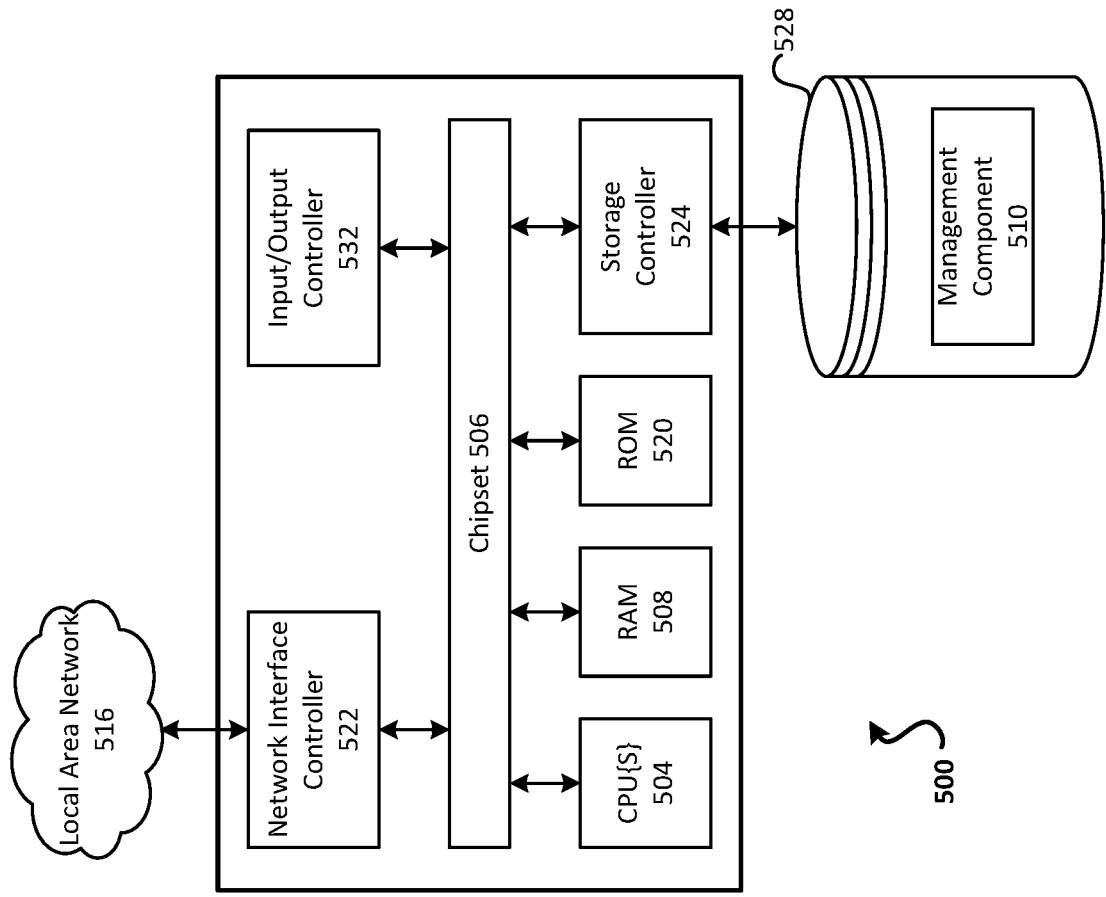
FIG. 5 is a diagram illustrating an example computing system architecture.

FIG. 5 depicts an example computer architecture for a computing system 500 capable of executing software for performing operations as described above in connection with FIGS. 1-4. The computer architecture shown in FIG. 5 illustrates a conventional server computer, workstation, desktop computer, laptop, tablet, network appliance, PDA, e-reader, digital cellular phone, or other computing node, and may be utilized to execute any aspects of the software components presented herein described as executing on systems 110, 120, 122, 124, and 142, or on any other computing system mentioned herein.

Computer 500 may include a baseboard, or "motherboard," which is a printed circuit board to which a multitude of components or devices may be connected by way of a system bus or other electrical communication paths. One or more central processing units (CPUs) 504 may operate in conjunction with a chipset 506. CPUs 504 may be standard programmable processors that perform arithmetic and logical operations for the operation of computer 500.

CPUs 504 may perform the operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

Chipset 506 may provide an interface between CPUs 504 and the remainder of the components and devices on the baseboard. Chipset 506 may provide an interface to a random-access memory (RAM) 508 used as the main memory in computer 500. Chipset 506 may further provide an interface to a computer-readable storage medium, such as a read-only memory (ROM) 520 or non-volatile RAM (NVRAM) (not shown), for storing basic routines that may help to start up computer 500 and to transfer information between the various components and devices. ROM 520 or NVRAM may also store other software components for the operation of computer 500 in accordance with the embodiments described herein.

Computer 500 may operate in a networked environment using logical connections to remote computing nodes and computer systems through LAN 516. Chipset 506 may include functionality for providing network connectivity through a network interface controller (NIC) 522, such as a gigabit Ethernet adapter. NIC 522 may be capable of connecting the computer 500 to other computing nodes over LAN 516. It should be appreciated that multiple NICs 522 may be present in computer 500, connecting the computer to other types of networks and remote computer systems.

Computer 500 may be connected to a mass storage device 528 that provides non-volatile storage for the computer. Mass storage device 528 may store system programs, application programs, other program modules, and data, which have been described in greater detail herein. Mass storage device 528 may be connected to computer 500 through a storage controller 524 connected to chipset 506. Mass storage device 528 may consist of one or more physical storage units. Storage controller 524 may interface with the physical storage units through a serial attached SCSI (SAS) interface, a serial advanced technology attachment (SATA) interface, a fiber channel (FC) interface, or other type of interface for physically connecting and transferring data between computers and physical storage units.

Computer 500 may store data on mass storage device 528 by transforming the physical state of the physical storage units to reflect the information being stored. The specific transformation of a physical state may depend on various factors and on different implementations of this description. Examples of such factors may include, but are not limited to, the technology used to implement the physical storage units and whether mass storage device 528 is characterized as primary or secondary storage and the like.

For example, computer 500 may store information to mass storage device 528 by issuing instructions through storage controller 524 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. Computer 500 may further read information from mass storage device 528 by detecting the physical states or characteristics of one or more particular locations within the physical storage units.

In addition to mass storage device 528 described above, computer 500 may have access to other computer-readable storage media to store and retrieve information, such as program modules, data structures, or other data. It should be appreciated by those skilled in the art that computer-readable storage media can be any available media that provides for the storage of non-transitory data and that may be accessed by computer 500.

By way of example and not limitation, computer-readable storage media may include volatile and non-volatile, transitory computer-readable storage media and non-transitory computer-readable storage media, removable and non-removable media implemented in any method or technology. Computer-readable storage media includes, but is not limited to, RAM, ROM, erasable programmable ROM (EPROM), electrically erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage, other magnetic storage devices, or any other medium that can be used to store the desired information in a non-transitory fashion.

Mass storage device 528 may store an operating system utilized to control the operation of the computer 500. According to one embodiment, the operating system comprises a version of the LINUX operating system. According to another embodiment, the operating system comprises a version of the WINDOWS SERVER operating system from the MICROSOFT Corporation. According to further embodiments, the operating system may comprise a version of the UNIX operating system. It should be appreciated that other operating systems may also be utilized. Mass storage device 528 may store other system or application programs and data utilized by computer 500, such as management component 510 and/or the other software components described above.

Mass storage device 528 or other computer-readable storage media may also be encoded with computer-executable instructions, which, when loaded into computer 500, transforms the computer from a general-purpose computing system into a special-purpose computer capable of implementing the embodiments described herein. These computer-executable instructions transform computer 500 by specifying how CPUs 504 transition between states, as described above. Computer 500 may have access to computer-readable storage media storing computer-executable instructions, which, when executed by computer 500, may perform operating procedures described above in connection with FIGS. 1-4.

Computer 500 may also include an input/output controller 532 for receiving and processing input from a number of input devices, such as a keyboard, a mouse, a touchpad, a touch screen, an electronic stylus, or other type of input device. Similarly, input/output controller 532 may provide output to a display, such as a computer monitor, a flat-panel display, a digital projector, a printer, a plotter, or other type of output device. It will be appreciated that computer 500 may not include all of the components shown in FIG. 5, may include other components that are not explicitly shown in FIG. 5, or may utilize an architecture completely different than that shown in FIG. 5.

Accordingly, systems and methods have been described for integrating web browser and telephone operation. A web browser may coordinate receiving audio input at a telephone and recording the audio input. The web browser may also coordinate playing of audio output at a telephone. While the systems and methods have been described in the example context of providing training for customer service representatives, the intended embodiments extend to performing integration for all suitable contexts.

It should be appreciated that the subject matter presented herein may be implemented as a computer process, a computer-controlled apparatus, or a computing system or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

It will be appreciated that while illustrative embodiments have been disclosed, the scope of potential embodiments is not limited to those explicitly described. For example, while the concepts are described with reference to requests received to perform particular types of functions or commands, the envisioned embodiments extend to processing involving any and all types of functions and commands. Similarly, while the concepts are described with reference to particular protocols and formats, the envisioned embodiments extend to processing involving any and all types of protocols and formats.

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed:

1. A method of communication, comprising:
   receiving, by a web browser, an input invoking audio output to a telephone number associated with a telephone;
   generating, by the web browser, a first audio stream, the first audio stream having a first format and associated with the telephone number;
   generating, by a WebRTC gateway, a second audio stream from the first audio stream, the second audio stream having a second format;
   communicating, by the WebRTC gateway, the second audio stream to a telephone switch for delivery to the telephone associated with the telephone number and communicatively coupled to the telephone switch;
   receiving, by the telephone, the second audio stream;
   receiving, by the web browser, an input from a user indicating an intent to provide a voice input by the user via the telephone associated with the telephone number and communicatively coupled to the telephone switch;
   receiving by the telephone the voice input by the user;
   communicating by the telephone an audio stream corresponding to the voice input; and
   receiving, by the telephone switch, the audio stream corresponding to the voice input.

2. The method of claim 1,
   wherein generating a first audio stream having a first format comprises generating a first audio stream having a VP8 format; and
   wherein generating a second audio stream having a second format comprises generating a second audio stream having a G.711 format.

3. The method of claim 1, further comprising communicating, by the web browser, the first audio stream to the WebRTC gateway.

4. The method of claim 3, wherein generating a second audio stream from the first audio stream comprises generating, by the WebRTC gateway, a second audio stream from the first audio stream.

5. The method of claim 1, wherein communicating the second audio stream to a telephone switch for delivery to a telephone associated with the telephone number comprises:
   communicating, by the WebRTC gateway, the second audio stream to a SIP gateway; and
   communicating, by the SIP gateway, the second audio stream to the telephone switch.

6. The method of claim 5, further comprising:
   communicating, by the telephone switch, the second audio stream to the telephone.

7. A method of communication, comprising:
   receiving, by a web browser, an input invoking audio output to a telephone associated with a telephone number;
   generating, by the web browser, a first audio stream, the first audio stream having a first format and associated with the telephone number;
   generating, by a gateway, a second audio stream from the first audio stream, the second audio stream having a second format;
   communicating, by the gateway, the second audio stream to a private branch exchange for delivery to the telephone associated with the telephone number and communicatively coupled to the private branch exchange;
   receiving, by the telephone, the second audio stream;
   receiving, by the web browser, an input from a user indicating an intent to provide a voice input by the user via the telephone associated with the telephone number and communicatively coupled to the private branch exchange;
   receiving, by the telephone communicatively coupled to the private branch exchange, the voice input from the user;
   communicating, by the telephone, a third audio stream corresponding to the voice input;
   receiving, by the private branch exchange, the third audio stream corresponding to the voice input;
   communicating, by the private branch exchange, the third audio stream corresponding to the voice input;
   recording, by a recording device, the third audio stream corresponding to the voice input; and
   storing the third audio stream.

8. The method of claim 7, wherein storing the third audio stream comprises storing the third audio stream in a database.

9. The method of claim 7, further comprising
   receiving, by the web browser, a request to review the third audio stream;
   communicating, by the web browser, the third audio stream to a WebRTC gateway;
   communicating, by the WebRTC gateway, the third audio stream to the private branch exchange; and
   communicating, by the private branch exchange, the third audio stream to the telephone.

10. A method for interfacing with a phone system, comprising:
    receiving, by a web browser, an input invoking audio output to a telephone number associated with a telephone;
    generating, by the web browser, an input initiating an audio session;
    communicating, by the web browser, a first request to initiate an audio session;

receiving, by a WebRTC server, the first request to initiate an audio session;

communicating, by the WebRTC server, a second request to initiate an audio session;

receiving, by a SIP gateway, the second request to initiate an audio session;

generating, by the SIP gateway, a third request to initiate an audio session;

receiving, by a telephone switch, the third request to initiate an audio session;

communicating, by the telephone switch, a fourth request to initiate an audio session;

receiving, by the telephone, the fourth request to initiate an audio session; and establishing, by the telephone, a session with the telephone switch receiving, by the web browser, an input from a user indicating an intent to provide a voice input by the user via the telephone associated with the telephone number and communicatively coupled to the telephone switch;

receiving, by the telephone communicatively coupled to the telephone switch, the voice input by the user;

communicating, by the telephone, an audio stream corresponding to the voice input; and receiving, by the telephone switch, the audio stream corresponding to the voice input.

11. The method of claim 10,
wherein generating an input initiating an audio session comprises receiving an input indicating to start a training session.

12. The method of claim 10,
wherein communicating a first request to initiate an audio session comprises communicating a request to establish a communication session with the telephone.

13. The method of claim 12,
wherein communicating a request to establish a communication session with the telephone comprises communicating a request comprising information identifying the telephone.

14. The method of claim 10,
wherein receiving, by a telephone switch, the third request to initiate an audio session comprises receiving the third request to initiate an audio session by a private branch exchange; and
wherein communicating, by the telephone switch, the fourth request to initiate an audio session comprises communicating the fourth request by the private branch exchange.

15. The method of claim 10, further comprising:
communicating, by the telephone switch, the audio stream corresponding to the voice input;
recording, by a recording device, the audio stream corresponding to the voice input; and
storing the audio stream.

16. The method of claim 10, further comprising:
generating, by the web browser, a first audio stream, the first audio stream having a first format;
generating, by the WebRTC server, a second audio stream from the first audio stream, the second audio stream having a second format; and
communicating, by the WebRTC server, the second audio stream to the telephone switch for delivery to the telephone associated with the telephone number.

* * * * *